Figure 1:
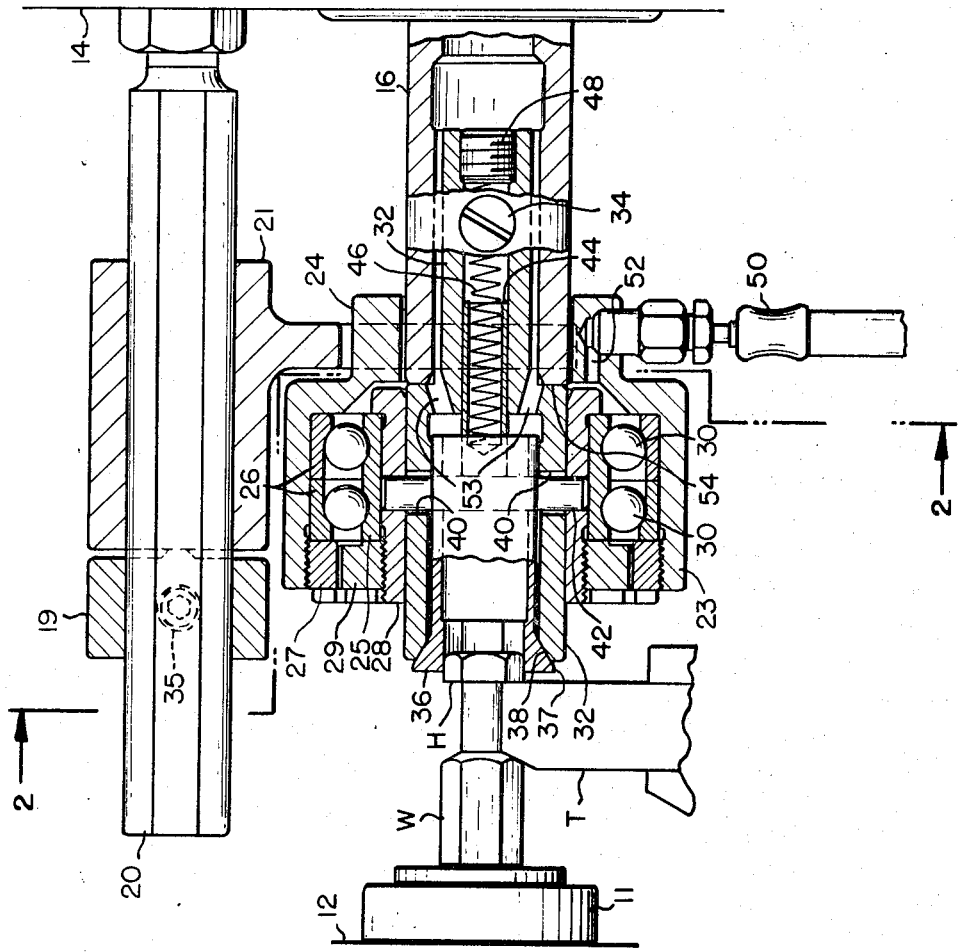

United States Patent

[11] 3,541,903

| [72] | Inventors | Earl W. Brinkman;<br>Wray S. Seymour, Rochester, New York |
|---|---|---|
| [21] | Appl. No. | 711,318 |
| [22] | Filed | March 7, 1968 |
| [45] | Patented | Nov. 24, 1970 |
| [73] | Assignee | Davenport Machine Tool Company Inc.<br>Rochester, New York<br>a corporation of New York |

[54] SCREW MACHINE CHUCK
4 Claims, 2 Drawing Figs.

[52] U.S. Cl. .................................................. 82/38,
10/107
[51] Int. Cl. .................................................. B23b 25/00
[50] Field of Search .......................................... 82/38;
10/107; 29/37; 279/43, 50

[56] References Cited
UNITED STATES PATENTS

| 2,061,417 | 11/1936 | Drissner et al. | 29/37 |
| 2,856,192 | 10/1958 | Schuster et al. | 279/43X |
| 3,176,553 | 4/1965 | Schubert | 82/38 |

Primary Examiner—Leonidas Vlachos
Attorney—B. Edward Shlesinger, Jr.

ABSTRACT: For supporting a workpiece in an automatic screw machine a chuck is mounted on a reciprocable tool spindle in axial alignment with a work spindle so that a workpiece mounted on the work spindle is held also at its projecting end during a tooling operation. The work and tool spindles are driven at the same speed. The tool spindle chuck is of the split collet type. The collet-closing sleeve is secured to the tool spindle to rotate and reciprocate therewith. It surrounds the collet and is mounted in an antifriction bearing whose outer race is held against rotation. The collet is spring-pressed to released position.

Patented Nov. 24, 1970  3,541,903

INVENTORS
EARL W. BRINKMAN
WRAY S. SEYMOUR

BY B.Schlesinger
ATTORNEY

SCREW MACHINE CHUCK

This invention relates to screw machines, and more particularly to a novel work-holding chuck for such a machine.

Conventional work-holding chucks grip a workpiece at one end and the workpiece projects beyond the chuck to be machined. This tends to subject the workpiece to a torque, when the workpiece is being machined.

A primary object of the present invention is to provide a type of chuck which can be mounted in the tool spindle of an automatic screw machine to cooperate with conventional work-holding means on the work spindle to provide an outboard support for the work, thereby to support the work at both ends while it is being machined.

Another object of the invention is to provide an outboard support, for the purpose described, in the form of a collet-type chuck.

Another object of this invention is to provide an improved chuck for rotatably supporting one end of a rotating workpiece in the tool spindle of an automatic screw machine, or the like, where the tool spindle is driven at the same speed as the work spindle.

Still another object of the invention is to provide an improved chuck of the type described, which is compact and which may be adjustably mounted in any desired position in the tooling area of the machine.

Other objects of the invention will be apparent hereinafter from the specification and from the recital of the appended claims, particularly when read in conjunction with the accompanying drawing.

Figure 2:
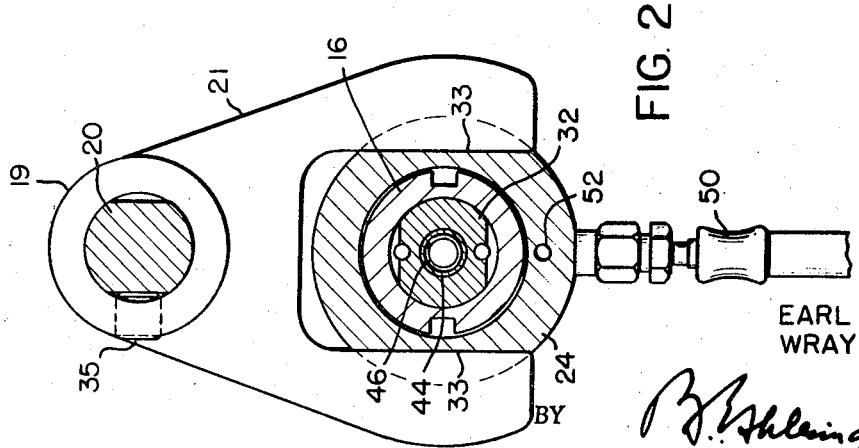

In the drawing:

FIG. 1 is a fragmentary side elevational view of an automatic screw machine showing particularly a tool spindle chuck, made in accordance with one embodiment of this invention, for drivingly supporting the projecting end of a workpiece, which is supported at its other end in a work spindle of the machine, parts of the chuck being cut away and shown in section; and FIG. 2 is a fragmentary sectional view taken along the line 2–2 in FIG. 1 looking in the direction of the arrows.

Referring now to the drawing by numerals of reference, W indicates a partially finished piece of work chucked at one end in conventional manner in one of the work spindles 11 of the rotating head 12 of an automatic screw machine. Mounted in conventional manner on the tool carrier 14 of the machine is a rotatable and reciprocable spindle 16, which in conventional practice might carry a tool for operating on the workpiece mounted on spindle 11. With the present invention it carries a collet which forms an outboard support for the workpiece.

Secured in spindle 16 by a screw 34 to rotate with this spindle is a collet-closing sleeve 32. This sleeve projects beyond the front end of the spindle 16, and is of enlarged diameter externally of the spindle so that it is formed with a shoulder 54 which abuts against the front end of this spindle. The sleeve 32 is formed at its front end with an internal conical surface 38.

Mounted within sleeve 32 is a conventional, tubular split collet 36, which has a plurality of jaws formed to resiliently grip a workpiece. Each jaw has at its forward end an external conical surface 37 that is complementary to the conical surface 38 on the inside of the collet-closing sleeve 32. The collet 36 is secured adjacent its rear end in sleeve 32 by a rigid pin 42, which extends diametrally through the collet and registering elongate openings 40 in the sleeve 32. Reciprocation of sleeve 32 to open and close the collet is effected by reciprocation of spindle 16, to which the sleeve is secured, by conventional mechanism such as the spring turnbuckle shown in Brinkman U.S. Pat. No. 2,114,626, granted April 19, 1938.

Collet member 36 is constantly urged toward released position by a hollow plunger 44, which is mounted for axial sliding movement in the bore of sleeve 32. A compression spring 46 is interposed between the plunger 44 and a plug 48, which is threaded into the inner end of sleeve 32.

Pin 42 is secured at its opposite ends in the inner thrust sleeve 28 of a ball bearing housed in a generally cup-shaped housing 23, that has a reduced diameter hub portion 24 at its rear, which surrounds the forward end of spindle 16. Housing 23 contains an inner ball race 25, and two outer races 26, and two sets of ball bearings 30. The races 25 and 26 are secured in housing 23 by nuts 27 and 29, respectively.

The housing 23 is held against rotation by a yoke 21 whose furcations engage opposite flatted sides 33 of the hub portion 24 of the housing. Yoke 21 is longitudinally adjustable on a rod 20, which is mounted on tool carrier 14 to project therefrom above and parallel to tool spindle 16. A collar 19, which is mounted on the rod 20 and is secured adjustably thereto by a set screw 35, limits forward movement of yoke 21 on rod 20.

Lubricating oil is supplied to the bearing housing 23 through a conventional conduit 50, which is removably secured to the hub 24 in communication with a port 52, that extends from the hub into the housing interior adjacent the rotatable inner race 25. Ducts 53 are provided so that cutting oil may be supplies from the center of the spindle to flush the collet clean.

To clamp the head H of a workpiece W at its projecting end, the spindle 16 is advanced axially toward the left in FIG. 1. The advancing spindle 16 forces the collet-closing sleeve 32 to the left relative to the collet 36. This clamps the projecting end of the workpiece to spindle 16.

The spindles 16 and 11 are connected to the central drive shaft of the machine in such manner that both spindles 11 and 16 are positively rotated at the same speed, thereby undesirable torque or twist on the work W is prevented during cutting engagement with the work of a tool such as the form tool T shown.

When the collet-closing sleeve is moved by spindle 16 to the left in FIG. 1 to clamp the collet onto the head H of the work W, the plunger 44 slides slightly rearwardly in the bore of sleeve 32 to increase the compression or resistance of spring 46. When the spindle 16 is retracted spring 46, through plug 41, releases collet 36, thus releasing the head H. Thereafter the yoke 21 may be withdrawn to disengage the work from the collet.

From the foregoing it will be apparent that applicants have developed a very compact and very versatile chucking device, which may be readily and removably mounted on the tool spindle of a screw machine for supporting and positively rotating at both its ends.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

We claim:

1. In an automatic screw machine having a work spindle for holding a workpiece at one end thereof, a rotatable and axially reciprocable tool spindle axially aligned with said work spindle, and means for driving both spindles at the same speed;
    a split tubular collet member having a work-clamping portion adapted to grip and hold the opposite end of the workpiece;
    a collet closing member;
    one of said members being mounted coaxially within the other, and both of said members being secured to said tool spindle to rotate therewith; and
    one of said members being also secured to said tool spindle to reciprocate axially with said tool spindle; and
    means for holding the other member against reciprocation with said tool spindle, whereby, upon axial movement of said tool spindle in one direction, said one member is moved in the direction to close said collet member and on movement of said tool spindle in the opposite direction said collet member is released.

2. An automatic screw machine as claimed in claim 1, wherein the means for holding said other member against reciprocation with said tool spindle comprises a pin fixed to said other member and extending radially of said tool spindle and through a slot in said one member which extends in the direction of the axis of said tool spindle.

3. An automatic screw machine as claimed in claim 2, wherein:
   said pin is fixed to the inner race of an anti-friction bearing which surrounds said members;
   a housing surrounds said bearing, a bracket is secured to said housing and is removably mounted on the frame of the machine to support said bearing coaxially of said tool spindle; and
said members and housing are movable as a unit in the direction of the axis of said tool spindle to move said members into and out of operative relation with said tool spindle.

4. An automatic screw machine as claimed in claim 1 wherein said collet closing member is a sleeve surrounding said collet member and secured to said tool spindle to rotate and reciprocate therewith, and is movable axially in one direction with said tool spindle to effect closing of said collet member and in the opposite direction to permit the collet member to open, and spring means is mounted on said tool spindle constantly to urge said collet member to open position.